United States Patent [19]

Osheroff

[11] Patent Number: 4,732,318
[45] Date of Patent: Mar. 22, 1988

[54] VELOCITY CONTROLLED FORCED AIR TEMPERATURE CONTROL SYSTEM

[76] Inventor: Gene W. Osheroff, 3932 Montego Dr., Huntington Beach, Calif. 92649

[21] Appl. No.: 944,975

[22] Filed: Dec. 22, 1986

Related U.S. Application Data

[63] Continuation-in-part of Ser. No. 820,514, Jan. 17, 1986, abandoned.

[51] Int. Cl.⁴ .............................................. F24F 7/00
[52] U.S. Cl. ........................................ 236/49; 165/22
[58] Field of Search ............... 236/49 D, 1 EA, 49 R; 62/175; 165/16, 22; 364/510

[56] References Cited

U.S. PATENT DOCUMENTS

| | | | |
|---|---|---|---|
| 3,814,173 | 6/1974 | Coon | 165/122 X |
| 4,422,571 | 12/1983 | Bowman | 236/49 |
| 4,487,363 | 12/1984 | Parker et al. | 236/49 |
| 4,531,573 | 7/1985 | Clark et al. | 165/22 X |
| 4,533,080 | 8/1985 | Clark et al. | 236/49 |
| 4,553,696 | 11/1985 | Ichikawa et al. | 236/49 |
| 4,583,683 | 4/1986 | Adachi | 236/49 |
| 4,585,163 | 4/1986 | Cooley et al. | 236/49 |

Primary Examiner—William E. Wayner
Attorney, Agent, or Firm—Gausewitz, Carr & Rothenberg

[57] ABSTRACT

A building temperature control system is velocity based, employing the velocity of air flowing into individual zones of temperature control to control temperature of the individual zones, total amount of air supplied to all zones from the air supply system, and the number of heating or cooling units in operation. Set point temperature for a particular zone is compared with actual temperature to generate a target velocity signal proportional to the temperature error. The target velocity signal is compared with actual flow velocity measured by the zone velocity sensor, and the difference between target and sensed velocity is employed to operate an air flow control damper valve until velocity of air flowing into the temperature control zone is equal to the target velocity. For control of total air delivered to all zones, the sum of all sensed zone air flow velocities is subtracted from total fan output capacity, and the difference bypassed through a supply system bypass duct, which it self includes a bypass velocity sensor. For control of the number of heating or cooling units in operation, total output fan capacity is divided into a number of overlapping ranges, and the total air flow demand, as determined by the sum of all sensed zone velocities, is compared to the several ranges, causing a single cooler/heater unit to operate when the total air flow demand is in a first lower range, causing two cooler/heater units to operate when the total air flow demand is in a second higher range, and similarly adding additional cooler/heater units as the total air flow demand increases to third and higher ranges. An air flow velocity sensor has a temperature responsive heat generator that is cooled by flow of cooling air over a heatsink connected to the generator and has its output compared with a reference which responds to ambient air temperature variation.

21 Claims, 7 Drawing Figures

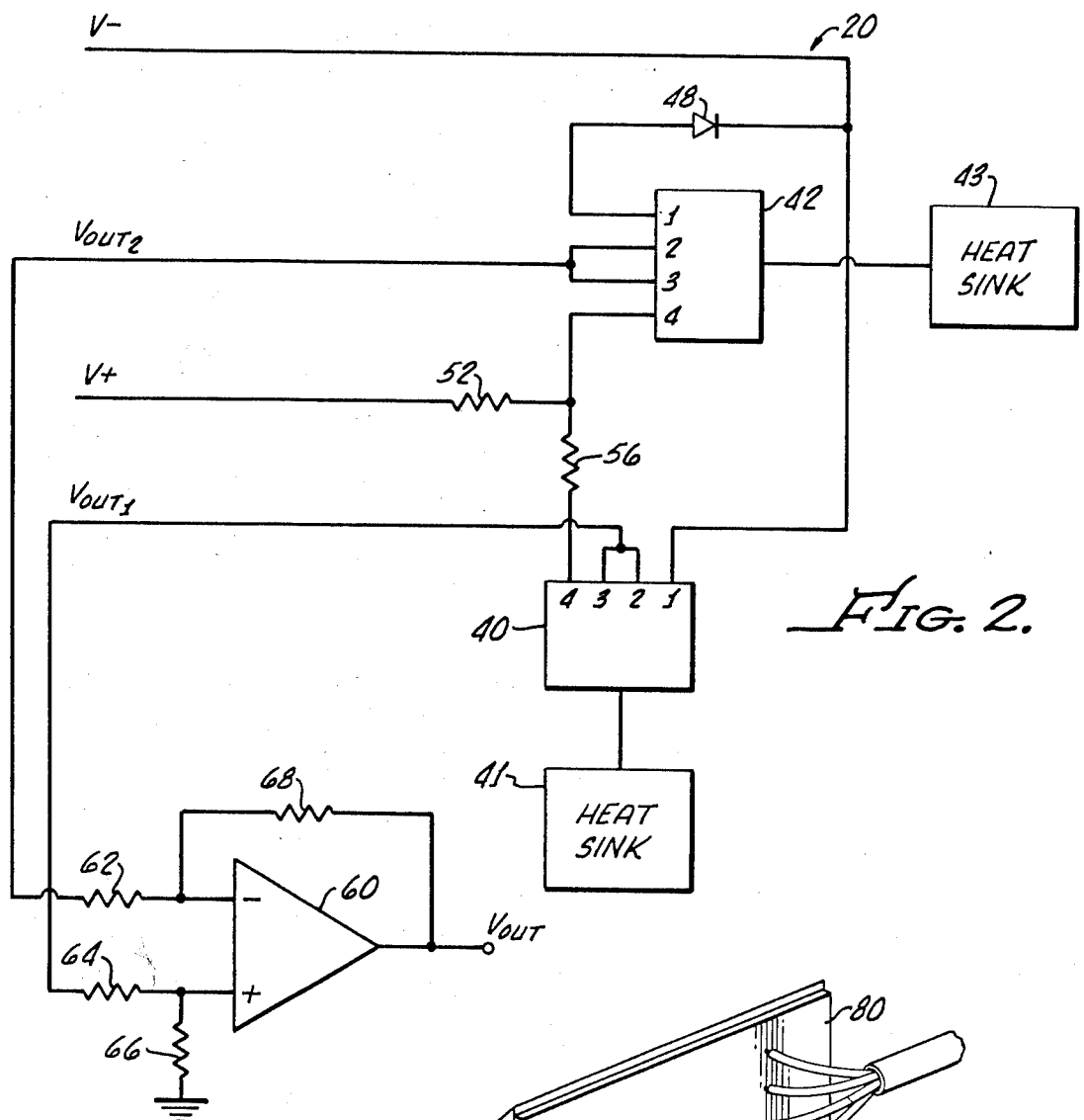
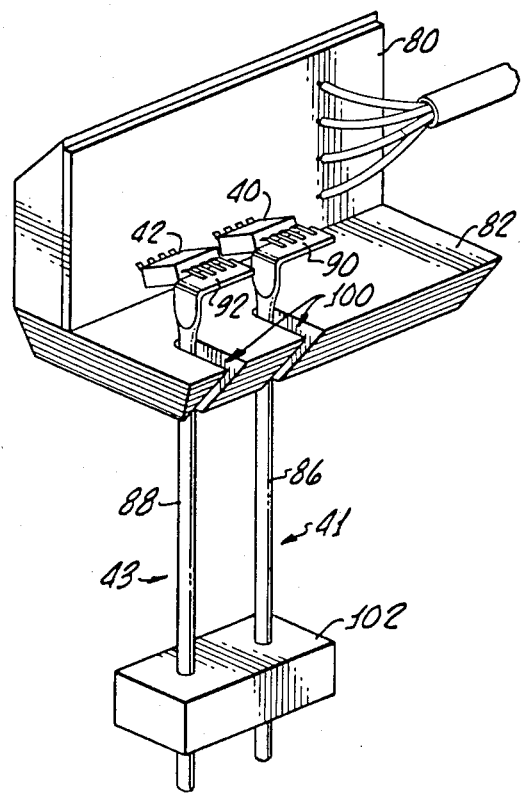

VELOCITY CONTROLLED FORCED AIR TEMPERATURE CONTROL SYSTEM

This application is a continuation-in-part of my co-pending application, Ser. No. 820,514, filed Jan. 17, 1986, now abandoned.

FIELD OF INVENTION

The present invention relates to the field of controlling temperature and air flow within a forced air heating and/or cooling system for regulating the temperature, for example, within a building.

BACKGROUND AND SUMMARY OF THE INVENTION

It is known in the art to supply forced air at some temperature above or below the temperature within a room in order to control the temperature within a room by raising or lowering the temperature as desired. Such systems include some means for supplying temperature regulated air, including air-conditioning units and/or heating units which supply air into a duct system within a building. Each zone within the building in which temperature is desired to be regulated is fed air from the duct system and includes a ventilation opening regulated by a damper. The air flow through the damper is regulated by a damper valve which is controlled by a damper control system. In some systems damper valve position is controlled by a closed loop in which actual damper valve position, sensed by a potentiometer, for example, is used as a feedback signal for comparison with a temperature error signal.

In the past it has been typical to regulate air flow through the damper by controlling the damper valve responsive to the temperature within the zone being regulated by the particular damper. A thermostat within a room supplied by the damper thus is typically used to provide a temperature error signal to the damper control valve, which is representative of the difference between the desired temperature in the room and the measured temperature as measured by the thermostat within the room. Damper valve position is thus controlled by the temperature signal.

Such systems suffer from a number of drawbacks, due largely to the fact that the pressure and the temperature of the air supplied to each individual ventilation opening for each individual zone throughout the system vary according to the position of the damper valve within the ducting system with respect to the source of the temperature controlled air. Thus, the dampers furthest away from the heating or cooling units will receive air which is at a lower pressure due to the loss of pressure resulting from supplying air to ventilation openings closer to the source of heated or cooled air. In addition, the temperature varies somewhat due to the losses in the surrounding environment, even in a relatively well insulated ducting sytsem.

Thus, in a system according to the prior art where the damper valve position is set according to the difference between the temperature in the room and the desired temperature in the room, fluctuations in the pressure at the particular damper valve, and also fluctuations in the temperature of the air supplied at the damper valve can often result in an error in the amount of air supplied to the room necessary to bring the room to the set temperature. Errors in desired temperature also occur when temperatures within other rooms throughout the system are less than or greater than the selected set temperature for the room, resulting in changes in demand at each particular damper valve. Such changes modify the pressure available at other damper valves. Moreover, the damper valves themselves typically are not linear throughout their range of openings, or if they are designed to be approximately linear throughout their range of openings, they can be expensive to manufacture. The result of any nonlinearity throughout the range of openings of the damper valve is that in a temperature feedback system the change in the air flow resulting from a signal indicating that the damper should be positioned to affect a four degree temperature change will likely not be twice the air flow resulting from a signal indicating the damper valve should be positioned to effect a two degree temperature change.

These drawbacks can cause the system to become out of balance and remain out of balance for long periods of time and to needlessly hunt within a particular temperature control zone to finally attain the set temperature within the zone as measured by the thermostat within the zone.

A multizone temperature control system for a building furnishes a supply of air, heated or cooled to a preselected temperature, to all or a selected group of the temperature control zones by means of a central fan or fans that blow air over a number, such as two, three or more, of heat exchangers, each coupled with a cooling compressor or a heater. The fan provides a predetermined quantity of air to the heat exchangers. Part of the temperature controlled air from the heat exchangers is fed to the individual temperature control zones, and another part is bypassed back to the fan input. It is common, at present, to operate the temperature control units, (e.g. the compressors or the heaters) according to temperature sensed in individual temperature control zones. A single one of the temperature control units (compressor or heater) is operated when sensed temperature is at or close to the desired point. Second, third or other temperature control units are turned on as sensed temperature departs further from the set point. For example, according to prior practice, if the temperature sensor in one temperature control zone of highest temperature is one degree or less above its set point, only one cooler compressor is operated. Should the temperature in such highest temperature control zone rise to more than two degrees above the set point at such temperature control zone, the second compressor is turned on and the two operate together. The second compressor is turned off if sensed temperature drops below a selected level. Therefore, the compressors may be turned on and off rapidly, which is damaging to the compressors. To alleviate this problem, prior systems may employ timers to prevent short period compressor cycling. Such timers inherently operate to delay a desired turn on or turn off of a compressor, and thus introduce further control error. In a system in which the control for selection of the number of operating compressors or heaters is based upon a temperature sensor in only the one highest temperature control zone, it is quite possible that the system may call for a second compressor to operate when temperature of only one of a large number of temperature control zones is too high. In other words, although only a small fraction of the cooling capacity of the system is needed to handle the raised temperature of the one temperature control zone, the system may call for operation of several compressors. In such a situation, either the air flowing to all of the temperature control zones will be cooled to an undesirably low temperature, or the compressors may freeze.

Many prior systems do not use a bypass around the system fan to divert air not needed for temperature control of the various zones. These arrangements required complex and inefficient methods to balance the air actually used and the fan output capacity, often requiring different arrangements for controlling the fan. In one prior system, the total amount of temperature controlled air fed to all of the temperature control zones collectively is varied in accordance wtih velocity of air flow in the air conditioner unit itself. If velocity slows down (indicating a build up of pressure), a fan bypass is opened to allow the velocity through the air-conditioner to increase. With such a system it is difficult to set up the air balance. To set up air balance, initially all zone dampers must be opened and the bypass is set so it is just ready to close. Then as zone dampers begin to close in response to temperature rise, pressure increases, velocity in the air-conditioner itself decreases, and the bypass will begin to open. Accurate balance of the air flow is very difficult in such a system. Such a system, in effect, senses increased pressure which is manifested as a decrease in velocity through the air-conditioner unit, but such pressure changes inherently and undesirably affect air flow to all zones.

Recognizing the need for an improved method and apparatus for regulating the air flow within temperature control zones within a building, and for regulating the temperature controlling air supply, it is a principal object of the present invention to provide an improved apparatus and method for such regulation.

A system embodying principles of the present invention employs air flow velocity sensors within the particular zone dampers. A control signal from the temperature sensor within the zone of temperature control is arranged to indicate a target velocity for the air flow into the zone of control. Control of zone temperature is obtained by modifying the damper valve position until the target velocity is obtained. In one sense damper position is controlled by a feedback loop in which sensed velocity is used to indicate damper valve position. The velocity sensed in the damper forms a feedback signal to the means for moving the damper valve to a position to attain the target velocity. The system also includes an improved apparatus for sensing the air flow velocity in the damper which is generally representative of the average air flow velocity throughout the cross section of the damper.

According to other features of the invention, both the fan bypass damper of the air supply system and the number of temperature control units in use are controlled in accordance with the total demand air flow, namely the total air actually being used by all of the temperature control zones collectively. Individual zone velocity sensors are used to provide a signal representing the total quantity of air used by all zones, which signal is compared with a signal representing total capacity of the fan, so as to control the fan bypass and to divert from the temperature control zones the difference between fan output capacity and the amount of air that is actually being used. A velocity based loop is also employed to control air flow through the fan bypass, directly sensing such velocity, for control of the bypass damper valve position.

For control of the number of temperature control units (heater or air conditioners), the output capacity of the fan is divided into a plurality of air flow quantity ranges so that the number of temperature control units activated at any given time depends upon the relation of the total demand air flow, as measured by all of the zone velocity sensors collectively, to the several air flow quantity ranges. For example, when total demand air flow is within a lower range, only one temperature control unit is activated. When total demand air flow is within a second higher range, a second temperature control unit is activated so that the two are operating together. According to one aspect of this operation, the adjacent ranges overlap to a small extent to decrease excessive on/off recycling.

The above noted deficiencies in the prior art are not intended to be exhaustive but rather are intended to indicate that the existing temperature control systems are less than satisfactory. Furthermore, the above described features of the present invention are also not intended to be exhaustive but rather are indicative of the features of the present invention, which those skilled in the art will better appreciate by reference to the detailed description of the preferred embodiment below in reference to the drawings.

BRIEF DESCRIPTION OF THE DRAWINGS

FIG. 2 shows a schematic diagram of a velocity sensing element employed in the present invention;

FIG. 3 is a perspective view of one form of velocity sensing heatsink employed with the circuitry of FIG. 2 to measure the velocity within a duct according to the present invention;

DETAILED DESCRIPTION OF A PREFERRED EMBODIMENT

Figure 1:
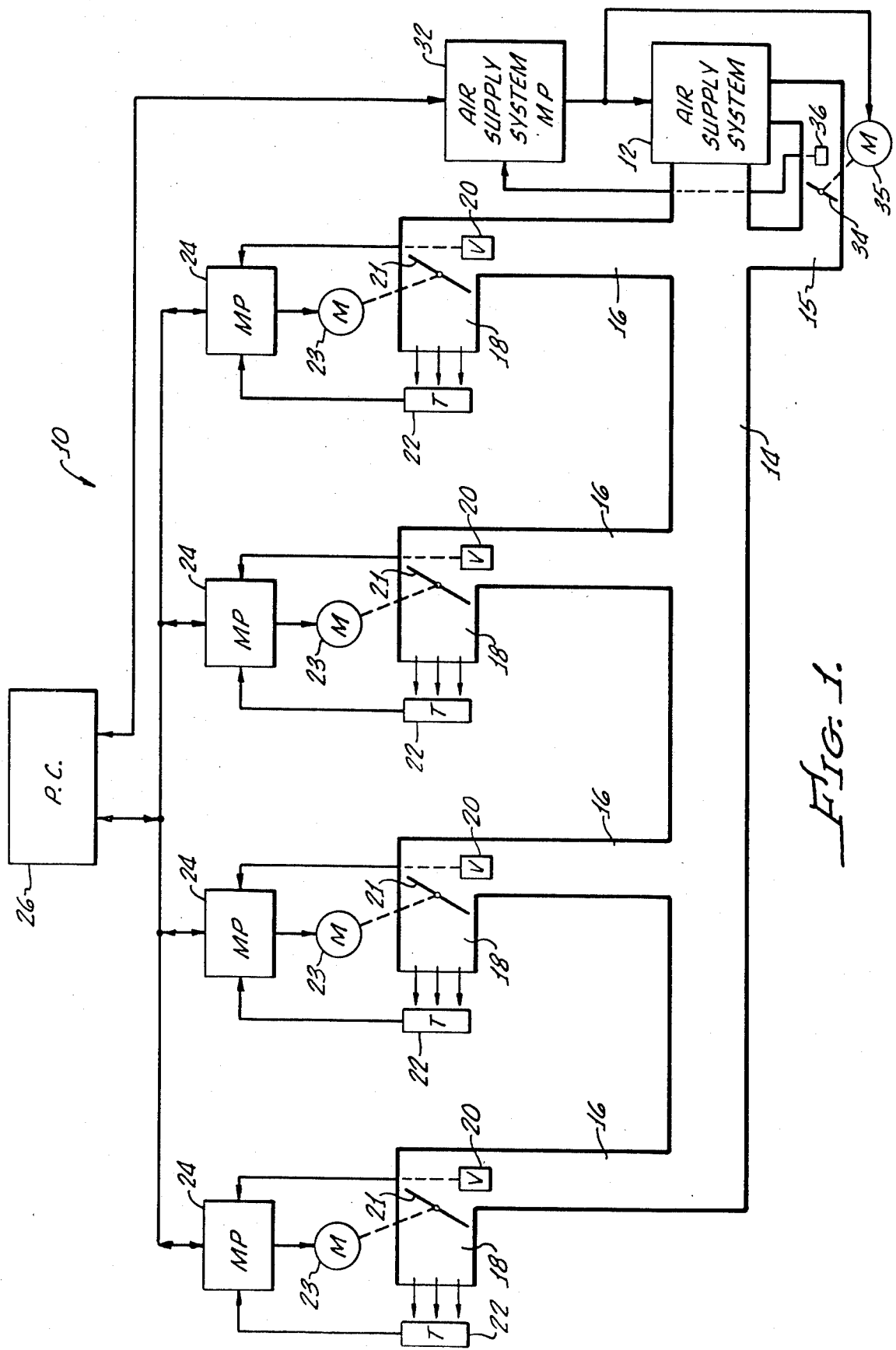
FIG. 1 shows a system block diagram of a temperature control system according to the present invention.

FIG. 1 illustrates a block diagram of a heating or cooling temperature control system 10 according to the present invention. The system 10 includes an air supply system 12 which may include means for cooling the supplied air, such as air-conditioning units and/or means for heating the air supplied to the system 10, for example heaters. The air supply system 12 has a sufficient number of heating or cooling units to supply a desired amount of heated or cooled air into a main duct system 14 which supplies branch or zone ducts 16 with sufficient heated or cooled air to supply the entire system. The specific makeup of the fans and heating and cooling devices of air supply system 12 may take any one of a number of forms that enable it to supply air to the system which is heated or cooled as necessary in sufficient quantity to supply the entire system. It will be understood that it is known in the art that such systems may be set up in a variety of ways, including one air supply system for each floor in a building or a portion of each floor in a building, or, depending upon the particular characteristics the building involved, one air supply system for two or more floors in a building. The air supply system has a bypass 15 from the main duct 14 which draws air from the main duct 14 back into the air supply system 12 in accordance with the total volumetric demand of the system, as will be more fully explained below.

Each branch or zone duct 16 is associated with a damper 18 which regulates flow into a particular temperature control zone within the building. Typically the temperature control zones will be, for example in an office building, one for each office space and several others dispersed throughout the common areas in, for example, a suite of office spaces within the building. Each damper 18 has a velocity sensor 20 which will be more fully described below and a damper control valve 21. The damper control valve is positionable by means, e.g., a bi-directional motor 23, to modify the air flow through the damper 18 in a manner which will be described more fully below.

Each temperature control zone has positioned therein a temperature sensor or thermostat 22. It will be understood, as is known in the art, that the thermostat 22 may not necessarily be in each particular office or common area supplied by a particular ventilation opening at a particular damper 18. The thermostats may be positioned at strategic places throughout a particular office space with one thermostat sensing the temperature for a number of different damper locations at the same time. However, the system is illustrated with a thermostat 22 for each damper 18. Each damper 18 includes a microprocessor 24 associated with the damper which obtains data from the thermostat 22 and the velocity sensor 20 associated with the respective damper 18.

The entire system is monitored and controlled as will be more fully explained below by a personal computer such as an IBM compatible computer 26. The personal computer 26 is in data communication with each of the microprocessors 24 and is also in communication with an air supply system microprocessor 32. The air supply system microprocessor 32 monitors and controls the air supply system and the bypass 15 by regulating a bypass dampe 34 to attain a selected velocity of air flow through the bypass 15, which velocity is measured by a velocity sensor 36 as will be more fully explained below. Microprocessor 32 also controls the number of heating or cooling units that are operating at a given time.

In operation the overall system is a velocity control system. A desired room temperature is set at each thermostat 22 for each particular zone of temperature control, or may be set for the entire building through the personal computer 26, either of which provide an input to the particular damper microprocessor 24 indicating the set temperature for an individual zone. Each thermostat 22 in a zone of temperature control provides an input to one or more damper microprocessors 24 indicating the actual temperature within the zone and the set temperature for the room. The microprocessor 24 compares the actual temperature with the set temperature to generate a damper valve control signal. The damper valve control signal is scaled to increase or decrease air flow velocity through the damper 18 to obtain a flow rate change of about one hundred cubic feet per minute for each sixteenth degree of temperature difference between the set temperature and the actual temperature. Thus, for example, if the system is in the air-conditioning (cooling) mode and the temperature is one eighth of a degree above the set temperature, the damper control signal from the microprocessor 24 operates the damper valve 21 to open the damper valve 21 to obtain a velocity increase in the air flow that is equivalent to 200 cubic feet per minute. The velocity sensor 20 then senses the change in velocity of air through the damper in response to the opening of the damper valve 21 and provides a feedback signal to the microprocessor 24 which stops the opening of the damper valve 21 when the sensed velocity has increased by a value that provides the desired increase of two hundred cubic feet per minute. Since flow rate in cubic feet per minute equals the product of velocity in feet per minute and duct area in square feet, and since duct area at the velocity sensor is always fixed, air flow velocity is proportional to air quantity flow rate and may be used interchangeably therewith, merely by multiplying velocity by an appropriate constant. The damper valve 21 is operated by a synchronous motor 23 which receives the appropriate control signal from the microprocessor 24.

A more detailed description of the described velocity control of the damper follows. It will be seen that the air temperature in the temperature controlled zone is regulated by flowing temperature controlled air into the zone, measuring air temperature within the zone, measuring velocity of the temperature controlled air flowing into the zone, and then varying such velocity so as to decrease the difference between the measured velocity and a velocity that is determined on the basis of the measured temperature. A feedback system is employed in which temperature and velocity are compared by providing a target velocity signal related to or based upon measured zone temperature. Thus a target velocity is established, having a value related to or preferably proportional to the difference between the measured temperature within the zone and the set temperature. The target velocity is compared with measured velocity, and the damper valve operated until measured velocity equals target velocity. More specifically, a signal representing the difference between measured and desired temperature is scaled so as to provide a damper control signal that represents or is proportional to a target air velocity or a velocity increment. The tareget velocity is computed as the sum of present velocity and a velocity increment or decrement based upon or, preferably, proportional to the magnitude of the measured temperature error. The relation between the temperature error and the velocity increment has been empirically determined, for a presently preferred embodiment, as one degree Fahrenheit being equivalent to 1800 feet per minute. Having established a damper control signal indicative of the target velocity, this control signal is compared with a measured signal representing actual velocity as measured by velocity sensor 20, and the difference is employed to operate the damper motor so as to move the damper toward either open or closed position until the difference between target velocity and measured velocity is zero, at which time the damper motor drive stops and the damper stops in the position at which the zero difference is attained.

Figure 6:
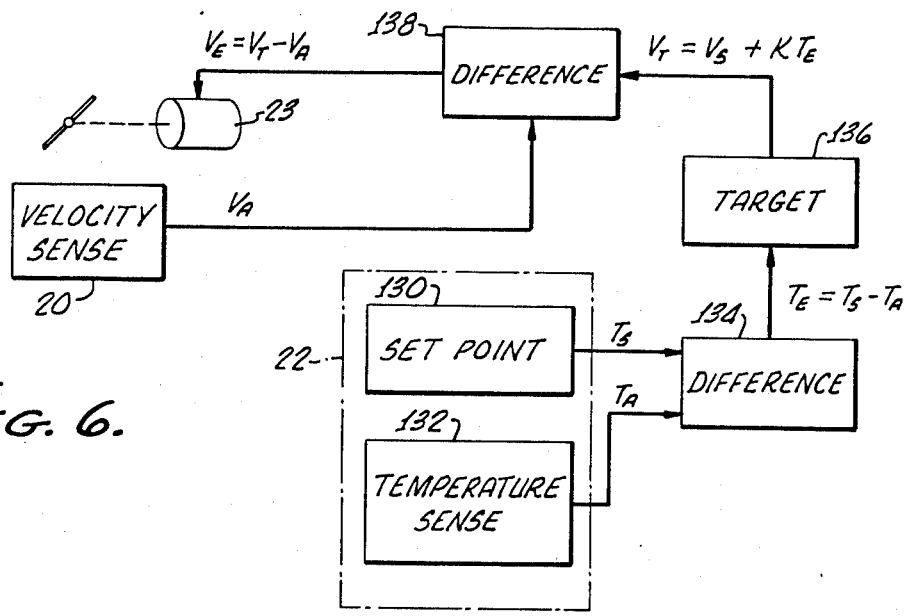
FIG. 6 is a functional block diagram of velocity based closed loop control of an individual zone damper.

The velocity based temperature control operation carried out for temperature control of each individual zone is functionally illustrated in FIG. 6, which depicts pertinent control functions that are actually carried out in the microprocessor 24.

When the room or zone is at the temperature set point $T_S$, measured velocity is set point point velocity $V_S$, and measured temperature is the set point temperature $T_S$, established by functionally illustrated set point control 130 of FIG. 6. Upon occurrence of a temperature change, actual temperature $T_A$ is measured by temperature sensor (thermostat) 132, and temperature error $T_E$ is computed in a difference circuit 134 as the difference between $T_S$ and $T_A$. In a target velocity circuit 136 temperature error $T_E$ is multiplied by a constant K to obtain velocity error $KT_E$, and combined with set point velocity to provide the target velocity $V_T$ which equals the sum of $V_S$, set point velocity, and velocity error $KT_E(V_T=V_S+KT_E)$. The constant K is a relational constant which equates 1800 feet per minute to one degree Fahrenheit, providing a relation of slightly more than 100 feet per minute velocity for each 1/16th degree Fahrenheit temperature change. The target velocity signal $V_T$ is utilized as a damper control signal and provided as the input to a servo difference circuit 138 which produces a velocity error drive signal $V_E$ to the motor, equal to the difference between target and actual velocity. Actual velocity is the feedback signal in this closed loop control and represents damper valve position. Therefore, when the difference $V_E$ between target and actual velocity is zero, the motor is no longer driven, but when the difference $V_E$ has a finite value, the motor is driven in one direction or the other so as to move the damper valve in a sense that will increase or decrease the measured velocity and thereby decrease the difference $V_E$. Maximum and minimum limits are established for the target velocity to ensure that air flow velocity into the individual zone remains within established limits.

FIG. 2 illustrates a circuit diagram of a velocity sensing circuit useful with the present invention. The velocity sensing circuit is a modified so-called Thomas sensing circuit. The circuit includes a pair of temperature sensing LM3911 integrated circuits 40 and 42 manufactured by National Semiconductor. The integrated circuits 40 and 42 include a zener diode (within the integrated circuit) connected across the V+ and V− input pins 4, 1. The emitter of the transistor is connected to the positive input of a transistor operational amplifier (within the integrated circuit), the collector of which forms an output on pin 3, which is connected at a feedback input on pin 2 to the negative input of the transistor operational amplifier contained within the LM3911 integrated circuit. The output on pin 3 is thus a voltage which is responsive to the temperature seen by the temperature sensitive transistor in response to heat generated by the zener diode within the integrated circuits 40,42. The integrated circuit housings also have a plurality of heat sink pins on the opposite side of each chip housing which, in a preferred embodiment of the present invention, are connected to respective heatsinks 41,43 as will be more fully explained below. The heatsinks 41,43 draw heat from the chips 40,42 thereby modifying the output voltage of the respective integrated circuits 40,42.

A diode 48 is connected between pin 1 on the integrated circuit 42, and the ground potential V−. The input voltage V+ of thirty volts is split across resistors 52 and 56 to set the positive voltage input V+ seen on pin 4 of each of the integrated circuits 40,42. In a presently preferred embodiment, resistor 52 is a 270 ohm resistor and resistor 56 is a 560 ohm resistor. The output voltage from integrated circuit 42 provides an input through a resistor 62 to the negative input of an operational amplifier 60. The output voltage from the integrated circuit 40 provides an input through a resistor 64 and across a resistor 66, connected to ground, to the positive input of an operational amplifier 60. The operator amplifier 60 has a feedback through resistor 68 to its negative input. The output of the operational amplifier 60 is a voltage with respect to ground which varies according to the velocity of air flow across the heatsinks 41 and 43 as will be further explained.

FIG. 3 shows a respective view of a heatsink arrangement embodying principles of the present invention. The temperature sensor circuitry, including the integrated circuit chips 40 and 42 shown in FIG. 2, is mounted on a printed circuit board 80 which is attached to a plastic L-shaped bracket 82 by screws (not shown). The L-shaped bracket 82 is in turn attached to the ducting of a damper with the L-shaped bracket 82 positioned inside the ducting. The heatsinks 41 and 43 associated with each of the integrated circuits 40 and 42 are shown to comprise a pair of lengths of copper rods 86,88 (only parts of which are shown in FIG. 3) of approximately ⅛ inch in diameter. Each copper rod 86,88 has one end thereof flattened and bent into an L-shaped portion 90,92 in order to solder the flattened portion 90,92 of the copper rod 86,88 to the respective integrated circuit chip 40,42 heatsink pins to increase the available surface area of the heatsink 41,43. The copper rods 86,88 are then passed through respective slots 100 in the L-shaped bracket 82 and extend from the L-shaped bracket 82 parallel to each other. Plastic spacers 102 hold the copper rods 86,88 in alignment with each other.

Figure 4:
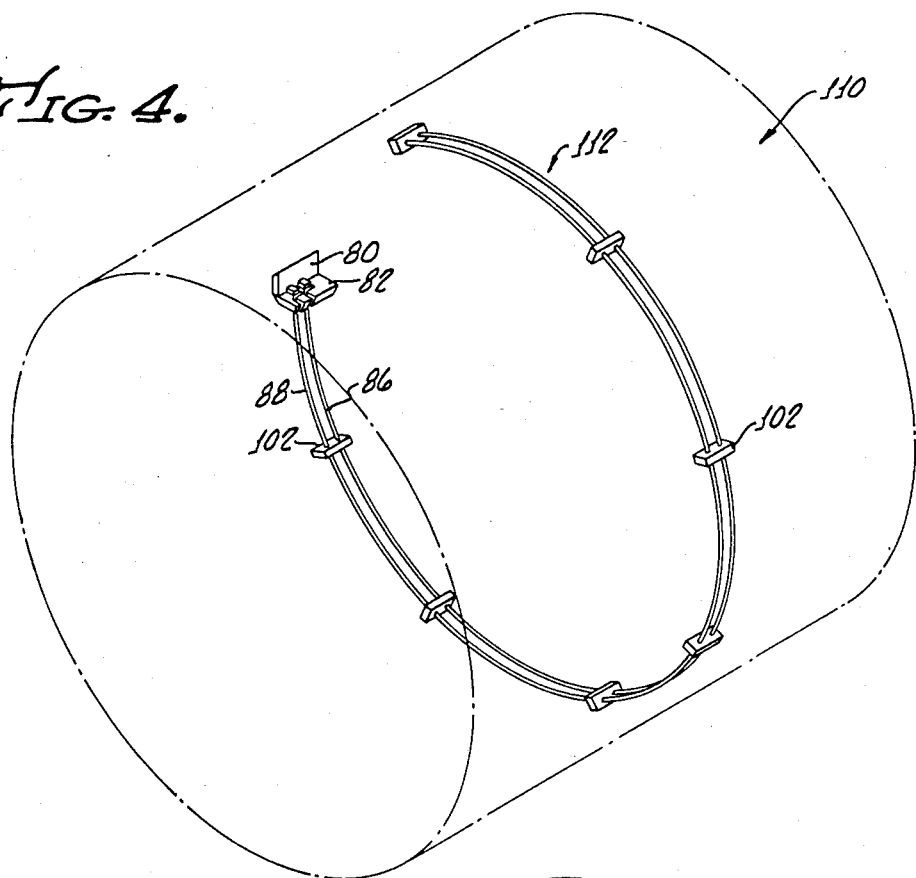
FIG. 4 is a view of the velocity sensor of FIG. 3, positioned within the damper.

FIG. 4 shows a perspective view of a duct 110 (shown in phantom lines) having the velocity sensing heatsinks 41,43 in the form of the copper rods 86,88 disposed therein in a loop 112. The loop 112 does not extend completely around the interior of the duct 110 due to the fact that the velocity sensor is adapted to be inserted into the duct through an opening in the side of the duct with the copper rods 86,88 in the loop form as shown in FIG. 4. Thus loop 112 extends approximately 300° and still the loop 112 can be inserted through the opening in the side of the duct 110 with the velocity sensing heatsink copper rods 86,88 fed through the opening to extend almost entirely around the inside of the duct 110. The L-shaped bracket 82 is thereby inserted into the opening of the duct 110 and is thereafter attached to the side of the duct 110.

The loop 112 is positioned to be in the cross section of the duct 110 at which the velocity of the air passing through the duct 110 is approximately the average velocity of the air passing through the duct 110. It will be understood by those in the art that a graph of the velocity profile for a circular duct 110 forms a hump with the maximum velocity at the centerline axis of the duct 110. In addition, it will be understood by those in the art that the velocity profile for a duct of smaller cross sectional area, for the same given maximum velocity, will form a hump having steeper sides than the hump of a graph of a larger area duct. Thus the spacing of the loop from the interior surface of the duct will vary according to duct size and other factors which determine the points of average velocity of air passing through the duct.

It is desirable but not absolutely necessary that the loop 112 be positioned at the location of the average velocity, since the system operates on relative changes in velocity from one temperature setting to another. So long as the loop is positioned at approximately where the average velocity exists, the system will operate properly. Those skilled in the art can empirically determine where the average velocity lies for a given duct and what range of positions of the loop 112 on either side of the average velocity position is acceptable for proper system operation.

In applications where the small size of a duct makes it difficult to insert the integrated circuit chip and their heat sinks, or where averaging of velocity sensing points is not needed, both heat sinks can be eliminated so that sensing of velocity is accomplished only at the point of the integrated circuit chip, by the chip itself, instead of sensing average velocity. The resulting decrease in accuracy of velocity sensing is acceptable in many situations where an accuracy of plus or minus ten percent is tolerable.

Figure 5:
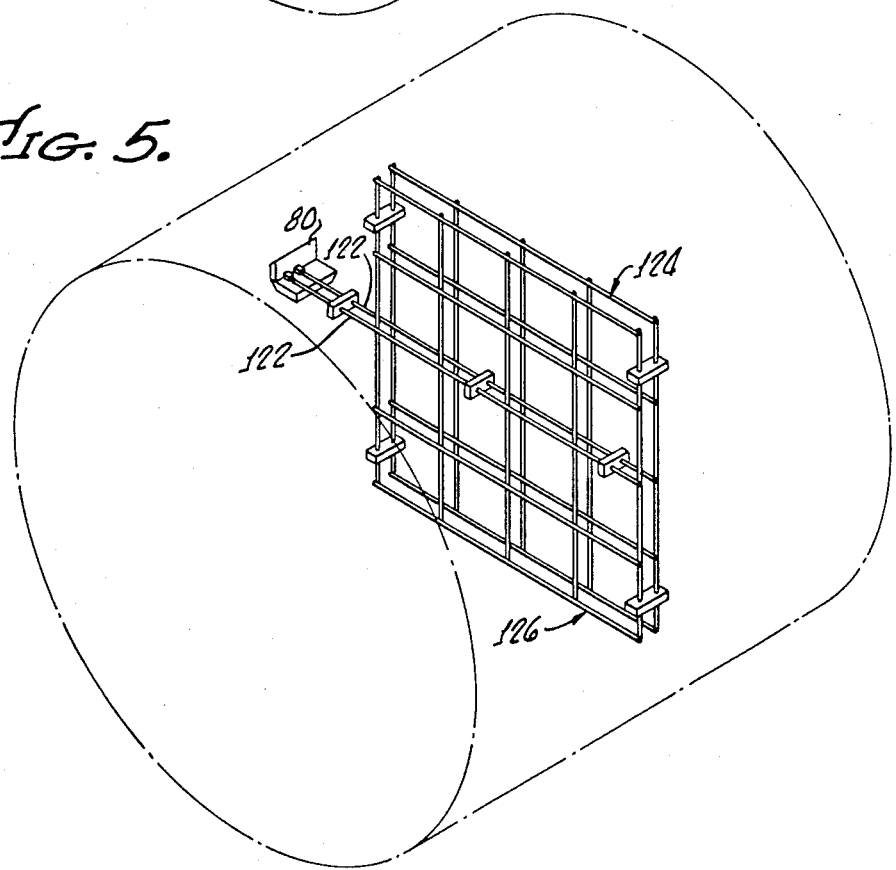
FIG. 5 is a perspective view of a second form of velocity sensing heatsink according to the present invention, positioned within a damper.

FIG. 5 shows a perspective view of a grid shaped heatsink which can be used for both circular and rectangular cross section ducts. One of the grid elements 122 on each grid 124,126 is extended and has a flattened portion similar to that in the loop shaped velocity sensing heatsink 112 for attachment to the heatsink pins of the integrated circuit housing.

Referring back to FIG. 2, operation of the velocity sensor according to the present invention can be better understood. The temperature responsive integrated circuit 42 havings its input only across resistor 52 has a higher positive voltage seen across the zener diode within the integrated circuit 42. Therefore, the heat generated within the zener diode is higher such that the heatsink 43 will be significantly affected by a change in velocity of air flow through the duct within the normal range of temperature operation of the air-conditioning system of between approximately 60 to 80 degrees. The heat generated within the zener diode within the integrated circuit 42 due to the selected value of resistor 52 will be in the range of approximately 120 to 130 degrees Fahrenheit. The high thermal conductance rods 86,88 conduct heat from the integrated circuit chip 42 to the elongated heatsink formed by these rods, from which heat is transferred to ambient air. The temperature of chip 42 tends to follow temperature of the heatsink. Radiation and conduction from heat dissipating rods 86,88 of a heatsink 43 will significantly vary over the range of velocities of air flow through the duct because the difference between heatsink temperature and air temperature is relatively large. Accordingly, flow velocity of cooler air passing the heatsink rods has a relatively large effect on the output of circuit 42. Higher velocity causes lower temperature of both heatsink and circuit chip, and lower velocity causes less cooling of heatsink and circuit chip. On the other hand, the zener diode in the integrated circuit 40, which is connected to V+ through both resistors 52 and 56 is subjected to a lower positive voltage and will generate a significantly lower amount of heat, such that the temperature of the integrated circuit 40 will be in the range of approximately 65 to 95 degrees, which exceeds the maximum expected temperature of air flowing through the duct. Changes in the air flow across the heat dissipating rods of heatsink 41 will not significantly modify the conductive heating of the air passing by the heatsink 41 so as to not significantly modify the temperature sensed by the transistor temperature sensor within the integrated circuit 40. In other words, because circuit 40 and its heatsink are normally at a lower temperature because of the lower voltage input, the difference between air temperature and temperature of this heatsink is relatively small and air flow velocity has a relatively small effect on the output of circuit 40. Its output changes primarily with change in ambient temperature. Accordingly, circuit 40 can operate as an ambient temperature reference for circuit 42.

Thus it will be seen that the integrated circuit 40 and its associated heatsink 41 serve as a temperature reference, measuring ambient temperature of the velocity sensor, and are relatively insensitive to air velocity, whereas the integrated circuit 42 and its associated heatsink 43 serve to measure the air flow velocity within the duct and has an output which is affected by both ambient temperature and air flow velocity. Thus differentially combining the outputs of circuits 40,42 will substantially eliminate or minimize effects of ambient temperature variation so that the resulting output more accurately indicates velocity. The change in output voltage on pin 3 of the integrated circuit 42 is a measure of the heat drawn away by the conductive heating of the air passing by the heatsink 43. The operational amplifier 60, which is external to the duct, is arranged to operate as an inverting amplifier connected to the output voltage of the integrated circuit 42 and a noninverting amplifier connected to the temperature reference output voltage of the integrated circuit 40, with the result being that the output of the operational amplifier 60, which is the difference between its inputs, is a voltage which varies with the change in velocity of the air flowing through the conduit and is effectively independent of ambient temperature.

In operation, the present invention provides a new concept in building temperature control based upon use of velocity sensing to control individual zones. Velocity sensing at individual zones is also used to control system fan output and the number of operating heating or cooling units. In a presently preferred best mode the system employs a combination of microprocessor 24 operated devices and an IBM P.C. compatible computer 26. Software drives these components to create a new and superior building control and operating system.

Each damper microprocessor 24, with its own unique identity, is installed as a part of each damper 18. This enables a computerized control system which is self balancing and pressure independent. The software operates the P.C. 26 as a system controller. The computer 26 communicates with the microprocessor 32 for the temperature treatment or air supply system 12.

The velocity sensor 20 is a part of each damper 18. The velocity sensor 20 constantly monitors changes in airflow through the damper 18. To control zone airflow, the microprocessor 24 reads the zone temperature from the thermostat 22 and compares it to a set point assigned by the computer 26. As previously mentioned, each degree Fahrenheit is divided into sixteen increments. In the air-conditioning mode, as the temperature rises above the set point, the microprocessor 24 calls for about one hundred feet per minute of additional velocity for each sixteenth degree temperature rise. The damper velocity sensor 20 constantly tells the microprocessor 24 the speed of the air through the damper 18. As previously described, a target velocity (damper control signal) is established on the basis of measured temperature. When air speed measured by velocity sensor 20 matches the target velocity, the microprocessor 24 stops movement of the damper valve 21.

The microprocessor 24 installed at each damper 18 controls all of the damper 18 operating functions. The microprocessor 24 receives zone set point, heating or cooling instructions and maximum and minimum flow rate values in cubic feet per minute from the computer 26.

Part of the information received from the P.C. 26 is assigned max/min CFM and damper (branch duct) area in square feet for the zone controlled by the damper 18 associated with a respective microprocessor 24. The microprocessor 24 divides the CFM values by the damper 18 cross-sectional area to arrive at maximum and minimum air velocities for the zone. This information is retained in the microprocessor 24 memory and updated by the computer 26. Because the air velocity through the damper 18 is constantly monitored, these limits are maintained. The microprocessor 24 will not allow more or less air to pass through the damper 18. This capability makes the system self balancing. On start up, each damper 18 will balance itself to limit its maximum flow. Manual balancing is not required because the velocity through the damper 18 is constantly monitored.

The damper 18 is pressure independent because any change in duct pressure will result in change in velocity. This change will be reported to the microprocessor 24, which immediately compensates to maintain the desired air flow.

The system includes a relay board as an interface between the computer 26 and each air treatment system 12. The relay board has terminals that are similar to the terminals on a thermostat. The relay board is made of up of a microprocessor 32 and five relays. Each relay has a signal light to indicate on/off operation. The relays control the components, e.g. compressors, heaters and the fan, which are typical components of an air treatment system 12.

Each relay board has an unique identification number. All of the relay boards wait for receipt of their specific identification number on the communication loop with the computer 26. When a board recognizes its identification number, it responds and then receives information from the computer 26. The information is stored in the microprocessor 32 memory. The stored information is used to operate the air treatment system 12 until the next batch of information is received. If the microprocessor 32 does not get new information for eight minutes, it will shut down the air treatment system 12.

Another function of the microprocessor 32 is to answer inquiries from the computer 26 and give a status report. It will report the number of compressors or heaters on the line at that time.

The microprocessor 32 operates also as the bypass controller of the bypass damper 34 of each air-conditioning unit. It will be understood that the bypass could be for each air-conditioner/heater in the air treatment system 12, or could be on a main duct 14 supplied by the air treatment system 12, as shown schematically in FIG. 1. The bypass is a standard damper with a damper valve 34 operated by a bi-directional motor 35. According to one feature of the invention a velocity sensor 36 in the bypass duct enables improved control of the damper valve. The microprocessor 32 is programmed to control the amount of air to be bypassed according to the total amount of air delivered to all zone ducts, as will be explained in further detail below in connection with FIG. 7. When the computer 26 polls all of the dampers 18 connected to one air treatment system 12, it computes the total CFM being delivered to the zone ducts by that system. The computer also computes, from information received from microprcessor 32 as to the number of fans operating, the total amount of air the air treatment system 12 is then capable of supplying to the duct 14 system. The computer 26 subtracts the total amount of air being delivered through all the dampers 18 from the amount of air available from the air treatment system 12. The bypass controller within the microprocessor 32 tells the damper 34 to bypass this difference in air quantity by indicating the velocity of air flow through the bypass 15 to be achieved by the motor 35 positioning the damper valve 34.

When the computer 26 receives information from the damper microprocessors that the air flow demand (e.g. the total quantity of air actually flowing into all temperature controlled zones, collectively) of the system is above some selected value, it signals the microprocessor 32 to bring another air-conditioning/heating unit on line. Assuming, by way of simplified example, that there are four air-conditioning units available, only one unit is operated when air flow demand is less than 20%. When the system air flow demand is 20% of total air flow capacity with all four units, the computer 26 signals the microprocessor 32 to start another air-conditioning unit. Similarly, when the system demand goes to 40% or above, the microprocessor 32 is commanded to start a third unit, and when the system demand increases to 60% or above, the microprocessor 32 is commanded to start the fourth unit. In this manner, the system will always have enough cooling or heating capacity to supply the demand and excess capacity will be bypassed in the bypass 15. Preferably some overlap in the air flow demand ranges is provided as will be more particularly described below.

All of these system components are controlled by the P.C. 26 in a presently preferred embodiment. The computer 26 is an IBM P.C. compatible with 256K of on board memory. It operates using a Microsoft type disk operating system. The computer 26 has an asynchronous board to operate the communications loop. The computer 26 also has a continuous, seven day, battery backed clock and calendar. One disk drive is included to accommodate floppy disk software. Modem capability to interface the computer with a telephone can also be added.

The asynchronous board in the computer 26 operates the communications loop. The loop is a two wire, twisted pair, daisy chain. All of the microprocessors 24 and microprocessor 32 in the system are daisy chained together. All of these components have integral transceivers. The communications loop is like a party line telehone system. All of the transceivers listen to the party line waiting for their specific identity. When they detect their identification number, they answer. After any device is called by identification number it can transmit and receive data over the communications loop.

The computer software to operate all of the components has a number of functional portions. They include:
1. Initilization (building configuration),
2. Clock,
3. Operating system,
4. Diagnostics, and
5. Energy Audit.

A software diskette furnished with the system is inserted into the disk drive of an IBM compatible computer to be used for the initialization. The software is programmed to poll each microprocessor 32 to obtain the number of air-conditioning/heating units, in each air treatment system 12, and, thus, in the entire building.

The following questions are then asked for each air treatment system:
1. Number of zones connected to the air treatment system 12;
2. Clock functions which include operating times, day/night set back requirements, and weekend operation;
3. Identification of the first zone connected to the particular air treatment system 12;
4. Maximum and minimum CFM for the first zone;
5. Damper 18 area in square feet for the first zone;
6. Maximum and minimum CFM for each additional zone; and
7. Damper 18 area in square feet for each additional zone.

The initilization process collects this information for each air treatment system 12 and all of the dampers 18 in the building. After all of this information is entered, it is stored on the memory of computer 26. Once the information is in the memory, reports can be generated and printed. All of the operating information for each air treatment system 12 can be printed out and checked for accuracy. The initialization software is set up to allow for corrections, additions, deletions, and other modifications. After the initialization is complete, the operations software then takes over.

The operations software takes information from the initilization as stored in memory, such as, air treatment system 12 identification number 12, damper 18 identification numbers and other component identification numbers. Air treatment system 12 number one is selected for the first poll. The computer 26 selects the number of the first damper 18 connected to air treatment system 12 number one. The damper 18 identification number is sent out on the communications loop. The dampers' microprocessor 24 responds that it is ready to receive data. The computer 26 sends out the desired building temperature. The computer 26 then takes the damper area information for this zone and divides it into the stored max/min CFM. The result is the max/min velocity to be allowed through the damper 18. This information is sent to the microprocessor 24. Based on temperature information for the building, the computer 26 will decide on heating, cooling or cooling with reheat as is further explained below. This information is also sent to the damper microprocessor 24. All of this information is stored by the damper microprocessor 24. The microprocessor 24 will use this information to operate the damper 18 until further instructions are received. If the microprocessor 24 loses contact with the computer 26, it will continue to operate on its last instructions.

Before polling the next damper microprocessor 24, the computer 26 will ask the present damper microprocessor 24 to report the zone temperature and air velocity. The velocity is converted by the computer 26 to CFM using the formula velocity times area equals CFM. The computer 26 records this information for later processing.

Each zone in the first system is polled in this way. After all zones have reported, the computer 26 can decide on changes in air requirements and cooling or heating. The computer has stored in memory the air-condition/heater fan capacity in CFM for each of the units within each air treatment system 12. As part of the initialization the computer 26 will add up all of the air volumes for each damper 18 to arrive at the amount of air needed from this particular air treatment system. This air quantity is subtracted from the fan capacity of the air treatment system 12. The resulting difference will be converted to velocity and sent to the bypass 15 damper microprocessor 32. The bypass damper 34 will open or close enough to pass the desired amount of air.

As the computer 26 is polling it will look at each zone temperature for all zones connected to a particular air treatment system 12 and subtract it from the desired building setpoint. All pluses are added to indicate zones over set point. All minuses are added to determine the number of zones under set point. The number minuses is divided by the number of zones connected to the particular air treatment system 12. If the result is more than thirty percent, the computer 26 will switch over to heating operation. This information is sent out to the air treatment system microprocessor 32. On its next poll the computer 26 will command all zone damper microprocessors 24 within the system supplied by the particular air treatment system 12 to operate in the heating mode.

After the first air treatment system 12 and its damper microprocessors 24 are polled, the computer 26 will poll each additional air treatment system 12 connected to the computer 26 (up to nine). Each air treatment system 12 is operated by its microprocessor 32 from the gathered information specific to its zones. The bypass 15 for each air treatment system 12 will be controlled by the microprocessor 32 based on the information received from the computer 26.

After polling all of the air treatment systems 12, the computer 26 will repeat the process. Sixty damper microprocessors 24 and one air treatment microprocessor 32 can be polled in less than two minutes.

When diagnostics are desired, the computer 26 must be equipped with a monitor and a keyboard. The diagnostic software can then be put into operation. The computer 26 can then be asked to display any operating system information. Zone temperatues and CFM for the complete system or a single zone can be displayed. Hard copy can be created by connecting a printer to the computer.

Figure 7:
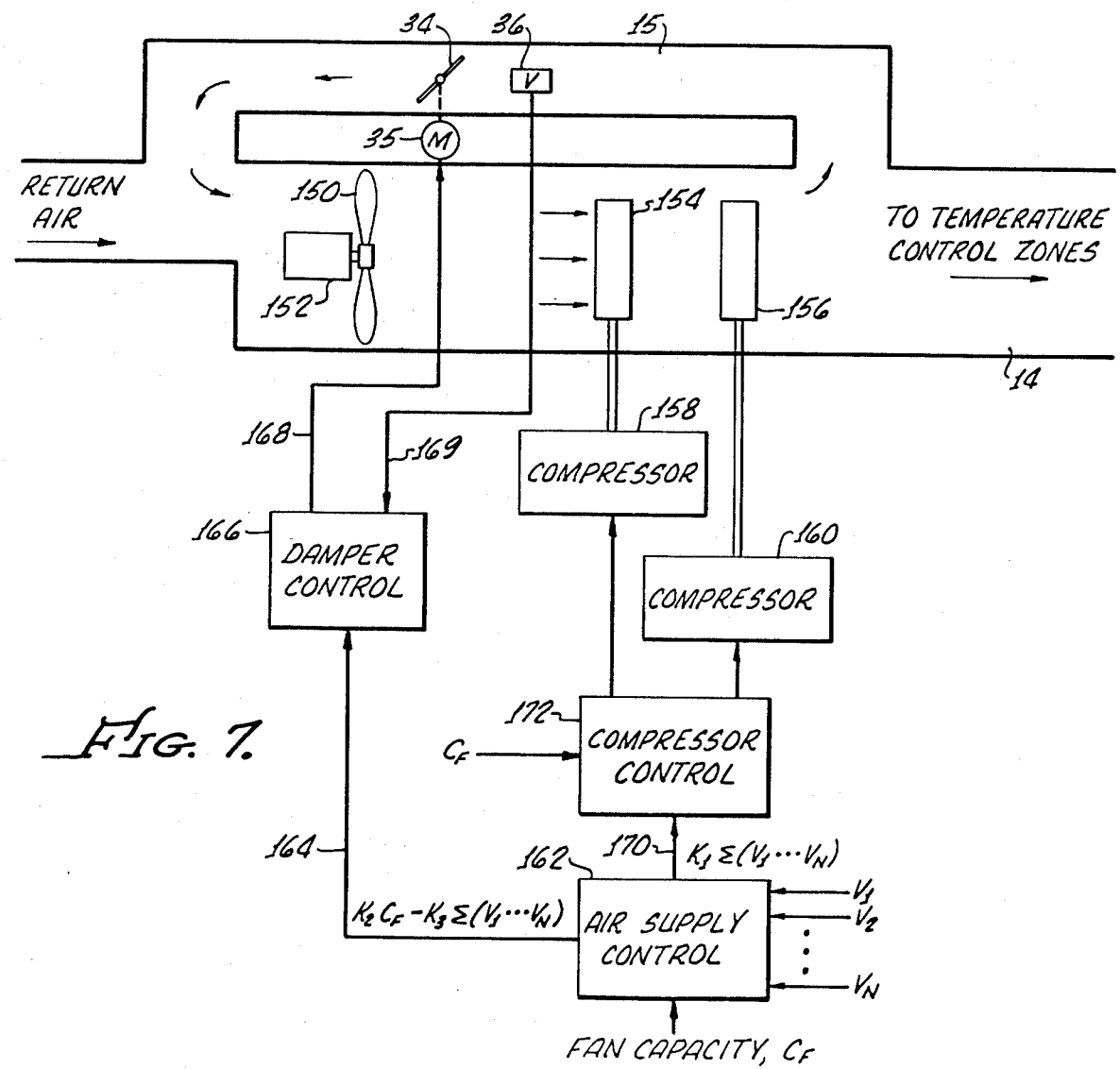
FIG. 7 is a block diagram showing further details of control of an air supply system.

Reference is now made to FIG. 7. Control of a single air supply system is illustrated in this figure, which is a functional block diagram showing further details of the manner in which the fan bypass and the individual compressor/heater units are controlled, all on the basis of air flow velocity sensed at the several controlled zone ducts. The air supply system, such as the air supply system 12 generally indicated in FIG. 1, includes a fan 150 which may, of course, have two or more fans driven by a motor or motors 152. For purposes of this discussion, it may be considered that the motor 152 drives the fan 150 at a constant speed to provide a constant volume of output air from the fan. The output of the fan is blown across a plurality of air-conditioner heat exchangers 154,156 which are operated, in the exemplary illustration of FIG. 7, by first and second compressors 158,160 respectively. It will be readily understood that although only two air-conditioning units 154,158 and 156,160 are illustrated, the system may employ three, four or even more as may be necessary or desirable to handle the various areas to be cooled. Further, although cooling units are illustrated in FIG. 7, it will be understood that the system may also include a number of heating units which also embody heat exchangers positioned in the flow of air output from fan 150. Thus, heat exchangers 154,156 may be considered, for purposes of this discussion, to represent either air-conditioning (cooling) units or heater units, or both. Temperature controlled air from the heat exchangers flows to the main duct 14, through which it is transferred to the individual branch ducts 16, all as previously described. Air from the heat exchangers is also fed to the bypass duct 15 which contains a velocity sensor 36 of the type described above and a damper control valve 34. Air from the bypass duct is returned to the fan input to be mixed with air returning from the individual zones.

According to a feature of the present invention, the amount of temperature controlled air that is fed from the fan and heat exchangers to the main duct 14 for use in the several temperature control zones is adjusted according to the actual measured air flow demand of the system. The air flow demand of the system is computed on the basis of measurements made by the individual zone velocity sensors 20, as indicated in FIG. 1. Thus, as indicated schematically in FIG. 7, an air supply control circuit 162 has fed into it the total fan capacity $C_F$ and receives individual signals $V_1$ through $V_N$ respectively indicating the actual sensed velocity (measured by velocity sensors 20) of air flowing into each of the temperature control zones individually. The air supply control circuit 162 adds all of the individual velocity signals together, and converts the total into an air flow quantity which is subtracted from the total of fan capacity $C_F$ to provide a damper control signal on line 164, indicated by $K_2 C_F - K_3 \Sigma(V_1 \text{---} V_N)$, where $K_2$ and $K_3$ are relational constants. The signal on line 164 is fed as a first input to a damper control circuit 166 which receives as a second input a velocity signal on line 169 from the velocity sensor 36, suitably scaled to represent air flow quantities. The damper control circuit provides an output control signal on line 168 that is fed to damper control motor 35. The control signal is proportional to the difference between sensed velocity and a computed bypass velocity, the latter being proportional to the difference between total capacity and total air flow demand. Use of velocity sensor 36 in the closed loop control of damper valve 34 enables more accurate control of bypass air flow. Thus the total amount of temperature controlled air flowing to all of the zones is simply controlled on the basis of the air actually being used.

As another feature of the invention, the number of heating or cooling units is controlled on the basis of the total air flow demand and not on the basis of temperature sensed in any one or more temperature controlled zones. Air supply control circuit 162, as previously mentioned, receives the individual velocity signals $V_1$ through $V_N$ (from the individual zone velocity sensors) and totals these to provide an output air flow demand signal $K_1 \Sigma(V_1 \text{---} V_N)$ which is fed to a compressor control circuit 172, where $K_1$ is a relational constant. The compressor control circuit divides the total air flow quantity signal into a plurality of predetermined ranges and turns on one or more of compressors 158, 160 according to which of the predetermined ranges includes the air flow demand signal on line 170. As another example, somewhat different from the example described above, assume a system having a total capacity from the air supply system of 20,000 cubic feet per minute and two compressors of equal cooling capacity. The system is arranged so that only compressor 158 normally operates when the demand air flow quantity is within the range of 0 to 10,000 CFM, and so that both compressors 158 and 160 operate when the total air flow demand is in the range of about 10,000 to 20,000 CFM. Preferably a small degree of overlap of the two ranges is established. To more particularly describe use of overlapping ranges in the specific example of a 20,000 CFM system, the first compressor 158 operates alone, in the lower range, until air flow demand rises to 11,000 CFM, at which value the second compressor 160 is turned on. Both continue to operate at slow rates higher than 11,000 CFM. As air flow demand decreases, the second compressor 160 is not turned off until the demand decreases below the 11,000 CFM, to about 9,000. Therefore, in this exemplary system, compressor 158 is operating throughout both ranges, whereas compressor 160 is turned on as the air flow demand increases from a lower value to 11,000 CFM but is turned off only when air flow demand decreases from a higher value to 9,000 CFM. Overlapping of the air flow quantity operating ranges of the two compressors avoids rapid on/off cycling of the second compressor since a 2,000 CFM change of air flow demand must take place between any two successive on/off operations of the second compressor.

It will be readily appreciated that although only two compressors and two ranges are described in connection with FIG. 7, systems embodying three, four or more compressors will employ three, four or more successively higher, slightly overlapping air flow demand ranges with the compressors so controlled that only one additional compressor is added as air flow demand increases to the next higher range. Where a plurality of heaters are employed, the number of such heater units is also be controlled according to the relation of total air flow demand to the several over-lapping air flow ranges so that, in general, one heater operates with the air flow demand in the lowest range; two heaters operate with air flow demand in the second higher range; three heater units operate with the air flow demand in the third higher range; etc.

Thus it will be seen that for both control of flow through the bypass 15 and for control of the number of compressors (temperature control units) in operation, the described system obtains a total air flow demand signal by measuring velocity of air flowing into each individual zone and summing the individual measurements. Although this method is presently preferred, it is also possible to obtain a total air flow signal (for use as described above to control the system supply bypass or number of units) by use of a velocity sensor in the main duct 14, downstream of the air supply system 12.

The foregoing detailed description is to be clearly understood as given by way of illustration and example only, the spirit and scope of this invention being limited solely by the appended claims.

What is claimed is:

1. A temperature control system for regulating air flow of heated or cooled air into temperature control zones within a building, wherein each zone has associated therewith an air flow duct and a damper within the air flow duct to regulate the amount of air flow into the zone, said system comprising for each zone:

temperature selecting means for selecting a set temperature within the zone;

temperature sensing means for sensing actual temperature within the zone;

control signal generating means for generating a control signal in response to the difference between the set temperature and the sensed temperature, such control signal representing a selected velocity of air flow through the duct into the zone;

velocity sensing means for sensing the air flow velocity through the duct controlled by the damper;

comparator means for comparing the sensed velocity to the selected velocity and generating a damper control signal, damper positioning means for positioning the damper in response to the damper control signal; and said system further comprising an air supply system for supplying flow of heated or cooled air into all of said zones, said air supply system having an output capacity, means responsive to the velocity sensing means of all of said zones for generating a demand air signal indicative of the total quantity of air flowing into all of said zones, and means responsive to said demand air signal for diverting from said zones a quantity of air from said air supply system based upon the difference between said output capacity and said total quantity.

2. A temperature control system for regulating air flow of heated or cooled air into temperature control zones within a building, wherein each zone has associated therewith an air flow duct and a damper within the air flow duct to regulate the amount of air flow into the zone, said system comprising for each zone:

temperature selecting means for selecting a set temperature within the zone;

temperature sensing means for sensing actual temperature within the zone;

control signal generating means for generating a control signal in response to the difference between the set temperature and the sensed temperature, such control signal representing a selected velocity of air flow through the duct into the zone;

velocity sensing means for sensing the air flow velocity through the duct controlled by the damper;

comparator means for comparing the sensed velocity to the selected velocity and generating a damper control signal, damper positioning means for positioning the damper in response to the damper control signal; and said system further comprising an air supply system for supplying temperature controlled air into all of said zones, said air supply system having a plurality of temperature controlling units, means responsive to the velocity sensing means of all of said zones for generating a demand air signal indicative of the total quantity of air flowing into all of said zones, and means responsive to said demand air signal for selectively operating a number of said temperature controlling units based upon said total quantity of air flowing into all of said zones.

3. A temperature control system for regulating air flow of heated or cooled air into temperature control zones within a building, wherein each zone has associated therewith an air flow duct and a damper within the air flow duct to regulate the amount of air flow into the zone, said system comprising for each zone:

temperature selecting means for selecting a set temperature within the zone;

temperature sensing means for sensing actual temperature within the zone;

control signal generating means for generating a control signal in response to the difference between the set temperature and the sensed temperature, such control signal representing a selected velocity of air flow through the duct into the zone;

velocity sensing means for sensing the air flow velocity through the duct controlled by the damper;

comparator means for comparing the sensed velocity to the selected velocity and generating a damper control signal, damper positioning means for positioning the damper in response to the damper control signal;

said velocity sensing means comprising first temperature measuring means for generating a measured output signal indicative of temperature, an air velocity sensor thermally coupled to the temperature measuring means for changing the measured output signal of the temperature measuring means in response to changes in velocity of air flow through the duct, said air velocity sensor including a thermally conductive element thermally coupled with said temperature measuring means and exposed to air flow in the duct.

4. The system of claim 3 including reference means for adjusting said measured output signal in accordance with ambient temperature.

5. A temperature control system in which air temperature is regulated within a plurality of zones of control each supplied by forced air flow through individual conduits, each conduit having a damper therein and each conduit serving a zone of control and connected to a main conduit into which temperature controlled air is supplied by a temperature controlling system having an output into the main conduit and a bypass around the main conduit, said system comprising:

damper control means operatively connected to each damper, each damper control means including means for sensing the velocity of air flow through the respective damper and means for positioning the damper to obtain a selected velocity of air flow through the damper;

system control means in data communication with each damper control means, said system control means including data storage means for storing data representing the velocity of air flow through each respective conduit and the cross-sectional area of each respective conduit, means for computing from such data the total system volumetric flow demand, and means for increasing the air flow into the main conduit system or bypassing air flow from the main conduit system responsive to the total system volumetric flow demand.

6. A temperature control system for regulating temperature in each of a plurality of temperature zones comprising a plurality of zone ducts for individually supplying air to respective ones of said zones, flow control means for regulating air flow through each of said ducts individually, means for measuring air flow through said zone ducts, an air supply system for supplying temperature controlled air to said zone ducts, and means responsive to said means for measuring for varying the amount of temperature controlled air supplied from said air supply system to all of said zone ducts collectively in accordance with the total amount of air flow through all of said zone ducts, said flow control means comprising, for each zone duct, a damper, a temperature sensor in the zone supplied by the zone duct, means responsive to the temperature sensor and the means for measuring air flow for operating the damper to control temperature within the zone, said air supply system including a bypass duct, and said means for varying including means for controlling air flow through said bypass duct, said means for controlling air flow through said bypass duct comprising a damper valve in said bypass duct and a feedback loop responsive to said means for measuring air flow through said zone ducts for positioning said damper valve, said feedback loop including velocity sensor means for measuring velocity of air flow through the bypass duct to provide a feedback signal representative of damper valve position.

7. A temperature control system in which air temperature is regulated within a plurality of zones of control, each supplied by forced air flow through individual zone ducts, each zone duct serving a zone of control and all connected to a main duct into which temperature controlled air is collectively supplied by a plurality of controlled temperature air supply units having a total air flow output capacity to the main duct, said temperature control system comprising:

means including air flow sensing means for providing a demand air flow signal representing the total amount of air flowing in all of said zone ducts, means responsive to said demand air flow signal for activating or deactivating individual ones of said units in accordance with the total amount of air flowing through said zone ducts, whereby a first number of said units is activated when the total amount of air flowing through said zone ducts is within a first range of air flow and a larger number of said units is activated when the total amount of air flowing through said zone ducts is in a second range of air flow that is higher than said first range of air flow.

8. The temperature control system of claim 7 wherein said first and second ranges include common values.

9. The temperature control system of claim 7 wherein the upper limit of said first range is above the lower limit of said second range.

10. The temperature control system of claim 7 including means responsive to said demand air flow signal for comparing said total amount of air with said total air flow output capacity and providing a bypass control signal indicative of the difference between said total air flow output capacity and the total amount of air flowing in all of said zone ducts, and means responsive to said bypass control signal for diverting from said zone ducts an amount of air from said air supply units according to the difference between said output capacity and the total amount of air flowing in all of said zone ducts.

11. The temperature control system of claim 10 wherein said air flow sensing means comprises a velocity sensor for sensing air flow velocity through each zone duct, and including a temperature sensor in each zone duct, a damper for adjusting air flow velocity through each zone duct, and a control circuit responsive to said temperature sensor and to said velocity sensor for operating said damper.

12. The temperature control system of claim 11 wherein said means for diverting comprises a bypass duct, a damper valve in said bypass duct, a bypass velocity sensor in said bypass duct for providing a bypass velocity signal, and means responsive to said bypass control signal and said bypass velocity signal for operating said damper valve in said bypass duct.

13. A temperature control system for regulating temperature in each of a plurality of temperature zones comprising:

a plurality of zone ducts for supplying air to respective ones of said zones, a main duct connected to supply air to all of said zone ducts, flow control means for regulating air flow through each of said ducts individually, an air supply system for supplying temperature controlled air to said main duct, a bypass duct connected to said air supply system for diverting from said main duct air supplied by said air supply system, means for generating a control signal indicative of the total amount of air flowing through said main duct to said zone ducts, and means responsive to said control signal for diverting to said bypass duct from said main duct a quantity of air based upon the difference between the air flow capacity of said supply system and the amount of air flowing through said main duct, said means for diverting comprising a damper valve in said bypass duct and a feedback loop responsive to said control signal for positioning the damper valve, said feedback loop including means for sensing velocity of air flow through the bypass duct to provide a feedback signal indicative of position of said damper valve.

14. A temperature control system for regulating flow of heated or cooled air into temperature control zones within a building, wherein each zone has associated therewith an air flow duct and a damper within the air flow duct to regulate the amount of air flow into the zone, said system comprising for each zone:

temperature selecting means for selecting a set temperature within the zone;

temperature sensing means for sensing actual temperature within the zone;

control signal generating means for generating a control signal in response to the difference between the set temperature and the sensed temperature, such control signal representing a selected velocity of air flow through the duct into the zone;

velocity sensing means for sensing the air flow velocity through the duct controlled by the damper;

comparator means for comparing the sensed velocity to the selected velocity and generating a damper control signal;

damper positioning means for positioning the damper in response to the damper control signal, an air supply system for supplying flow of heated or cooled air into all of said zones, said air supply system having an output capacity, means responsive to the velocity sensing means of all of said zones for generating a demand air signal indicative of the total quantity of air flowing into all of said zones, and means responsive to said demand air signal for diverting from said zones a quantity of air from said air supply system based upon the difference between said output capacity and said total quantity.

15. A temperature control system for regulating flow of heated or cooled air into temperature control zones within a building, wherein each zone has associated therewith an air flow duct and a damper within the air flow duct to regulate the amount of air flow into the zone, said system comprising for each zone:

temperature selecting means for selecting a set temperature within the zone;

temperature sensing means for sensing actual temperature within the zone;

control signal generating means for generating a control signal in response to the difference between the set temperature and the sensed temperature, such control signal representing a selected velocity of air flow through the duct into the zone;

velocity sensing means for sensing the air flow velocity through the duct controlled by the damper;

comparator means for comparing the sensed velocity to the selected velocity and generating a damper control signal;

damper positioning means for positioning the damper in response to the damper control signal, an air supply system for supplying heated or cooled air into all of said zones, said air supply system having a plurality of temperature controlling units, means responsive to the velocity sensing means of all of said zones for generating a demand air signal indicative of the total quantity of air flowing into all of said zones, and means responsive to said demand air signal for selectively operating a number of said temperature controlling units based upon said total quantity of air flowing into all of said zones.

16. A temperature control system for regulating flow of heated or cooled air into temperature control zones within a building, wherein each zone has associated therewith an air flow duct and a damper within the air flow duct to regulate the amount of air flow into the zone, said system comprising for each zone:

temperature selecting means for selecting a set temperature within the zone;

temperature sensing means for sensing actual temperature within the zone;

control signal generating means for generating a control signal in response to the difference between the set temperature and the sensed temperature, such control signal representing a selected velocity of air flow through the duct into the zone;

velocity sensing means for sensing the air flow velocity through the duct controlled by the damper;

comparator means for comparing the sensed velocity to the selected velocity and generating a damper control signal;

damper positioning means for positioning the damper in response to the damper control signal, said velocity sensing means comprising first temperature measuring means for generating a measured output signal indicative of temperature, an air velocity sensor thermally coupled to the temperature measuring means for changing the measured output signal of the temperature measuring means in response to changes in velocity of air flow through the duct, said air velocity sensor including a thermally conductive element thermally coupled with said temperature measuring means and exposed to air flow in the duct.

17. The system of claim 16 including reference means for adjusting said measured output signal in accordance with ambient temperature.

18. A temperature control system for regulating temperature in each of a plurality of temperature zones comprising:

a plurality of zone ducts for individually supplying air to respective ones of said zones, flow control means for regulating air flow through each of said ducts individually, means for measuring air flow through said zone ducts, an supply system for supplying temperature controlled air to said zone ducts, and means responsive to said mean for measuring for varying the amount of temperature controlled air supplied from said air supply system to all of said zone ducts collectively in accordance with the total amount of air flow through all of said zone ducts, said means for measuring air flow comprising means for measuring air flow through each of said ducts individually, said air supply system having a predetermined air flow capacity, and said mean for varying the amount of temperature controlled air comprising means for diverting from said zone ducts an amount of air from said air supply system according to the difference between said air flow capacity and the total measured air flow through all of said zone ducts collectively.

19. The system of claim 18 wherein said air supply system includes a bypass duct, and wherein said means for diverting includes means for controlling air flow through said bypass duct.

20. A temperature control system in which air temperature is regulated within a plurality of zones of control, each supplied by forced air flow through individual zone ducts, each zone duct serving a zone of control and all connected to a main duct into which temperature controlled air is collectively supplied by a plurality of controlled temperature air supply units having a total air flow output capacity to the main duct, said temperature control system comprising means for sensing air flow through each individual zone duct, means responsive to said means for sensing for providing a demand air flow signal representing the total amount of air flowing in all of said zone ducts, and means responsive to said demand air flow signal for activating or deactivating individual ones of said units in accordance with the total amount of air flowing through said zone ducts, whereby a first number of said units is activated when the total amount of air flowing through said zone ducts is within a first range of air flow and a larger number of said units is activated when the total amount of air flowing through said zone ducts is in a second range of air flow that is higher than said first range of air flow.

21. The temperature control system of claim 20 including means responsive to said demand air flow signal for comparing said total amount of air with said total air flow output capacity and providing a bypass control signal representative of the difference between said total air flow output capacity and the total amount of air flowing in all of said zone ducts, and means responsive to said bypass control signal for diverting from said zone ducts an amount of air from said air supply units according to the difference between said output capacity and the total amount of air flowing in all of said zone ducts.

* * * * *